United States Patent [19]

Reger

[11] Patent Number: 4,814,770
[45] Date of Patent: Mar. 21, 1989

[54] POWER SUPPLY APPARATUS FOR A RADAR SYSTEM

[75] Inventor: Philip R. Reger, Newton Square, Pa.
[73] Assignee: International Marine Instruments, Inc., Stamford, Conn.
[21] Appl. No.: 947,372
[22] Filed: Dec. 29, 1986
[51] Int. Cl.[4] .......................... G01S 7/28; H04B 1/04; G05F 1/613
[52] U.S. Cl. .................................. 342/175; 455/127; 323/222; 323/284
[58] Field of Search ........................ 342/175; 455/127; 323/222, 284

[56] References Cited

U.S. PATENT DOCUMENTS 4,097,863 6/1978 Chambers ........................... 342/175

Primary Examiner—Thomas H. Tarcza
Assistant Examiner—Gilberto Barrón, Jr.
Attorney, Agent, or Firm—St.Onge Steward Johnson & Reens

[57] ABSTRACT

A power supply apparatus for a radar system of the type which has a control box including signal processing means and a source of electrical power, an antenna unit remote from the control box and including an antenna, a transmitter, a receiver and an IF amplifier, and a coupling cable of variable length between the control box and the antenna unit, the coupling cable coupling signals to and from the antenna unit as well as a power supply voltage and a tuning control voltage. The power supply apparatus comprises a switching mode power supply circuit having an input supplied with the power supply voltage and an output for providing a substantially stable output supply voltage for the receiver. A feedback circuit is responsive to the output supply voltage and is coupled to a control input of the switching mode power supply circuit for adjusting the operation of that circuit so as to maintain the output supply voltage substantially stable. A voltage regulator is coupled to receive the output supply voltage and respond thereto for supplying an IF power supply voltage to the IF amplifier. The power supply voltage that is supplied to the switching mode power supply circuit also is used as a transmitter power supply voltage.

12 Claims, 2 Drawing Sheets

POWER SUPPLY APPARATUS FOR A RADAR SYSTEM

BACKGROUND OF THE INVENTION

This invention relates to power supply apparatus for a radar system and, more particularly, to such apparatus which provides operating power for a tunable radar receiver, an IF amplifier used with that receiver and a radar transmitter, while minimizing the number of separate conductors which normally are provided between a "control box" and an "antenna unit" included in the radar system.

A typical radar system includes a "control box" and an "antenna unit". The control box includes a power supply for generating and supplying operating voltages for various components included in the antenna unit. The control box also includes signal processing circuitry, a radar display (such as a CRT) and other apparatus normally utilized by an operator in operating the radar system (e.g. a keyboard, a computer, etc.). The antenna unit of a typical radar system includes a rotating antenna for transmitting and receiving radar signals, transmitter circuitry responsive to transmit-control signals generated at the control box for supplying the antenna with radar signals to be transmitted, and receiving circuitry coupled to the antenna for receiving radar signals, reflected to the antenna and for producing video signals which, in turn, are supplied to the control box for processing, calculation and display. As is conventional, a cable is used to couple the control box to the antenna unit, this cable normally being provided with several individual conductors which supply control signals to the transmitter circuitry and to the receiver circuitry and which also supply video signals from the receiver circuitry to the control box. In addition, since the antenna unit normally is remote from the control box, operating power is generated at the control box and supplied to the antenna unit. Such operating power typically includes operating voltages for the transmitter circuitry and for the receiver circuitry, as well as an operating voltage for the usual intermediate frequency (IF) circuitry normally provided in or used with the receiver circuitry. Still further, although the transmitting and receiving circuitry are designed to operate at the same frequency, it is not unusual if the particular frequency to which the receiving circuitry is tuned differs, to a small degree, from the frequency to which the transmitting circuitry is tuned. Accordingly, to compensate for this frequency difference, or drift, a tuning voltage often is supplied from the control box to the receiving circuitry to provide electronic tuning so as to bring the receiving circuitry into a proper frequency relationship, thereby compensating for frequency drift.

Radar systems of the aforementioned type find ready application in a marine environment. As is conventional, the ship (or other) host vessel on which the radar system is located provides an electrical power supply from which the aforementioned transmitter, IF and tuning power supplies normally are derived. Suitable power supply circuitry usually is found in the control box; and the resultant power supply voltages are supplied to the antenna unit, thereby providing suitable operating voltages to the transmitter, the receiver and the IF electronics. However, one disadvantage of the conventional arrangement resides in the fact that the length of the cable which connects the control box to the antenna unit may be of variable length. That is, this length might not be known precisely in advance and, thus, when the radar system is installed, various adjustments are needed in the power supply circuitry at the control box so as to accommodate the particular length of the cable then in use. As is known, the voltage drop along a cable and, thus, the power loss presented thereby, is a function of the length thereof. When installing cables of longer than expected length, the operating voltage levels produced at the output of the power supply circuitry in the control box might have to be increased. Conversely, for cables of shorter than expected lengths, such operating voltage levels might have to be reduced. However, it was important that the IF power supply voltage and the receiver tuning voltage were of particular, predetermined values. Thus, adjustments in the power supply circuitry at the control box were necessary to compensate for different cable lengths while maintaining such predetermined voltage values.

Another disadvantage of prior art power supplies used in conventional radar systems is the requirement of several individual conductors included in the coupling cable which normally interconnects the control box and the antenna unit. Typically, a separate conductor is needed to provide operating power for the transmitter and receiver electronics, another conductor is needed to provide a separate power supply voltage to the IF electronics and yet another conductor is needed to provide a tuning power supply voltage to the receiver electronics. It is desirable to reduce the number of such conductors in the coupling cable; and it would be particularly advantageous to eliminate, if possible, the use of a separate conductor to provide an IF power supply to the IF electronics included in the antenna unit. As examples, a typical tuning power supply voltage generated at the control box is on the order of about 35 volts DC, and a typical IF power supply voltage generated at the control box is on the order of about 12 volts DC.

Usually, in conventional antenna systems, the control box and the antenna unit are designed independently of each other and are not necessarily matched. Matching occurs when the system is installed on, for example, a ship, and this matching takes into account the particular length of the cable extending between the control box and the antenna unit as well as other factors, such as the range over which the receiving circuitry should be tuned. Thus, a "fine" adjustment normally is needed to match a uniquely designed control box with a uniquely designed antenna unit.

OBJECTS OF THE INVENTION

Therefore, it is an object of the present invention to provide a simplified power supply for a radar system.

Another object of this invention is to simplify the coupling cable which must extend between a control box and an antenna unit in a radar apparatus.

A further object of this invention is to simplify the power supply that must be used in a radar system; and a more particular object is to provide power supply apparatus at the antenna unit for producing some of the power which, heretofore, had been produced at the control box.

An additional object of this invention is to provide power supply apparatus which generates both an IF power supply and a receiver tuning power supply in response to a transmitter power supply voltage.

Still another object of this invention is to locate power supply apparatus of the aforementioned type at the receiving antenna, thus minimizing the number of conductors which must be included in the usual coupling cable which extends between a control box and an antenna unit.

It is yet a further object of this invention to reduce the number of power supply conductors normally provided in a coupling cable between a control box and an antenna unit; and a specific objective is to reduce these conductors to a first conductor for providing the transmitter/receiver operating power, a second conductor for providing a receiver tuning voltage and a ground conductor.

Another object of this invention is to provide compensation for variations of voltage in the power supply tat is applied to the antenna unit from the control box of a radar system, thereby minimizing deleterious effects that might result because of the sensitivity of certain circuitry, such as IF circuitry, to power supply variations.

Another object of this invention is to provide a stabilized power supply for receiver circuitry included in radar apparatus.

A further object of this invention is to simplify the "matching" of a control box to an antenna unit in a radar system.

Various other objects, advantages and features of the present invention will become readily apparent from the ensuing detailed description, and the novel features will be particularly pointed out in the appended claims.

SUMMARY OF THE INVENTION

In accordance with this invention, power supply apparatus is provided for a radar system of the type having a control box which includes signal processing circuitry and a source of electrical power, an antenna unit remote from the control box and including an antenna, a radar transmitter, a radar receiver and an IF amplifier, and a coupling cable of variable length which extends between the control box and the antenna unit and which couples signals therebetween and which also couples a power supply voltage from the control box to at least the radar transmitter. The power supply apparatus includes a switching mode power supply circuit which has an input coupled to receive the power supply voltage supplied by the aforementioned coupling cable, and which also includes an output for providing a substantially stable output supply voltage for the receiver. Feedback circuitry responds to the output supply voltage and is coupled to a control input of the switching mode power supply circuit for adjusting the operation of that power supply circuit and, thus, maintain a substantially stable output supply voltage. This output supply voltage is coupled to a voltage regulator which, in turn, supplies a stable IF power supply voltage to the IF amplifier.

As a feature of this invention, the feedback circuitry includes a difference circuit for producing an adjustment signal as a function of the difference between voltages supplied thereto, one of these voltages being derived from the output supply voltage and the other being derived from a tuning power supply voltage that is coupled from the control box to the antenna unit.

As another feature of this invention, the switching mode power supply circuit includes a smoothing rectifier output which provides an output supply voltage of a magnitude greater than the power supply voltage which is coupled to the antenna unit from the control box. The switching mode power supply circuit includes a reference generator for generating a reference voltage substantially independent of temperature, a comparator for comparing the output signal produced by the feedback circuit to this reference voltage, and means for varying the output supply voltage as a function of this comparison. A switching circuit produces the output supply voltage dependent upon the duty cycle thereof, this duty cycle being varied as a function of the output of the comparator. In the event of noise present in the tuning power supply voltage that is coupled from the control box to the antenna unit, a smoothing capacitor tends to filter that noise, thereby desensitizing the operation of the feedback circuit.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
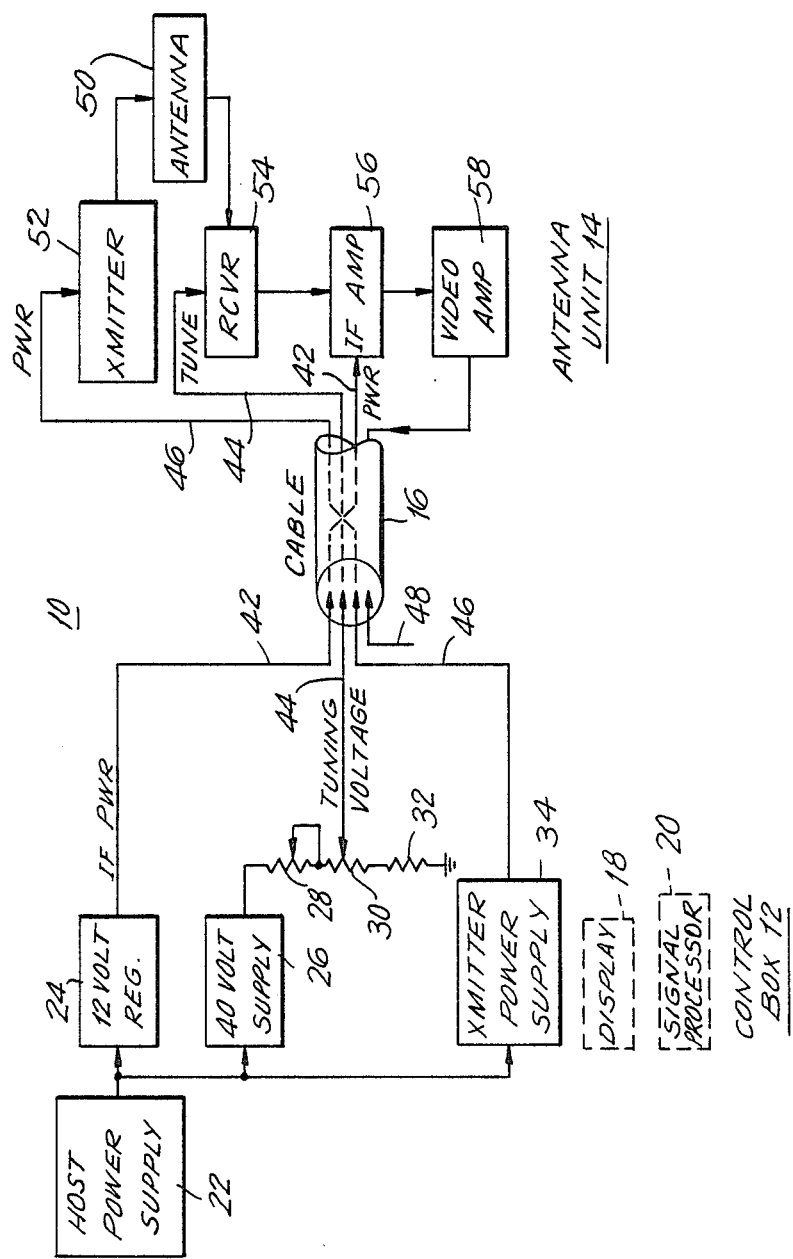
FIG. 1 is a block diagram of a conventional antenna system in which the present invention finds ready application.

Before proceeding with a description of the present invention, reference first is made to a conventional radar system, shown in block diagram form in FIG. 1, to provide an appreciation of the advantages and benefits provided by this invention. FIG. 1 illustrates a radar apparatus 10 including a control box 12, an antenna unit 14 and a multi-conductor cable 16 which extends between the control box and the antenna unit. Control box 12 includes, inter alia, a display device 18, signal processing circuitry 20 and power supply circuitry including a voltage regulator 24 and a 40 volt power supply 26. Display device 18 may include a CRT display of the type normally used in radar apparatus. As is known to those of ordinary skill in the art, this display device provides a visual indication of objects within the range of radar apparatus 10. Signal processing circuitry 20 provides trigger signals for triggering the transmitter component included in antenna unit 14 and also responds to video signals supplied from the receiver circuitry included in the antenna unit. These video signals ultimately are displayed on display device 18 and are further processed by the signal processing circuitry which, as is conventional, may include a computer or other data processing equipment. Since the present invention is not directed to the display device or the signal processing circuitry per se, further description thereof is not provided herein.

Although radar apparatus 10 finds diverse application, one typical usage thereof is as a shipboard radar system. Accordingly, the power supply electronics normally are coupled to power supply 22 which usually is provided on a ship. For convenience, power supply 22 is referred to herein as a host power supply and is intended to refer to the power supply normally provided with the vessel or other host with which radar apparatus 10 is used. The host power supply is coupled to voltage regulator 24 and to 40 volt power supply 26. Typically, voltage regulator 24 comprises a 12 volt regulator for producing a 12 volt IF operating voltage, also referred to herein as the IF power supply. 40 volt power supply 26 is used to provide "fine tuning" of the radar receiver electronics, as will be described below. Host power supply 22 also is coupled to a transmitter power supply 34 for the purpose of producing a suitable operating voltage for the radar transmitter.

The output of 12 volt regulator 24 is coupled to an IF power conductor 42, this conductor being included in multi-conductor cable 16. As will be described, IF power conductor 42 extends to an IF amplifier (and other IF circuitry) normally included in the antenna unit. 40 volt power supply 26 is coupled to a tuning voltage conductor 44, also included in multi-conductor cable 16, this conductor 44 extending to the radar receiver included in antenna unit 14 for supplying a suitable tuning voltage thereto. As illustrated in FIG. 1, the tuning voltage is derived from the output of 40 volt power supply 26 by means of a potentiometer 28, another potentiometer (or other adjustable resistors) 30 and a fixed resistor 32. These resistive devices provide an adjustable voltage divider for the purpose of producing an adjustably attenuated tuning voltage from the output of 40 volt power supply 26. This tuning voltage, which may be manually set by means of a potentiometer 28 and/or potentiometer 30, is supplied by tuning voltage conductor 44 to the radar receiver.

Transmitter power supply 34 is coupled to host power supply 22 and responds to the power supplied thereto to produce operating power for the radar transmitter. The output of the transmitter power supply is coupled to a transmitter power conductor 46 included in multi-conductor cable 16, this conductor 46 extending to the radar transmitter, as will be described. Hence, the transmitter operating power, IF operating power and tuning voltage all are derived at control box 12, and these respective operating voltages are coupled by separate conductors included in multi-conductor cable 16 to antenna unit 14. Other conductors are included in cable 16, such as additional conductor 48, for coupling various control and video signals between the control box and the antenna unit.

As is known to those of ordinary skill in the art, control box 12 normally is provided at one location of the host, such as on the bridge of a ship, and antenna unit 14 normally is located remotely from the control box, for example, at a suitably high location on the ship. The antenna unit includes, inter alia, a rotatable antenna 50 driven by a suitable motor (not shown), an transmitter 52 and a receiver 54. Although shown in block diagram form, it will be appreciated that the transmitter and receiver include electronic and microwave circuitry. Circuit details may be assumed to be conventional and, thus, are not shown. Antenna 50 is coupled to transmitter 52 and is supplied with radar signals for transmission. The antenna also is coupled to receiver 54 to supply thereto those radar signals which are reflected from distant objects. Receiver 54 may be of the electronically tunable type, known to those of ordinary skill in the art, and also may include mechanically adjustable azimuths. The receiver is coupled to IF circuitry 56, shown in FIG. 1 simply as an IF amplifier, and this IF circuitry is, in turn, coupled to a video amplifier 58. The output of the video amplifier is connected to a suitable conductor included in cable 16, this conductor extending to, for example, signal processing circuitry 20 included in control box 12.

Transmitter 52 includes a power supply input coupled to transmitter power conductor 46 for receiving the transmitter power supply voltage produced by transmitter power supply 34, as described above. Receiver 54 includes a tuning voltage input coupled to tuning voltage conductor 44 to receive the tuning voltage derived from 40 volt power supply 26, as mentioned previously. As is recognized, the particular frequency to which receiver 54 is tuned may be "finely" adjusted as a function of this tuning control voltage. IF amplifier 56, which is coupled to receiver 54, includes an IF power supply input coupled to IF power conductor 42 which, in turn, is supplied with the IF power supply produced by 12 volt regulator 24, as mentioned previously. The output of the IF amplifier is coupled to video amplifier 58 which, in turn, returns a video signal to control box 12.

It is recognized that cable 16 may exhibit variable length, depending upon the particular separation of control box 12 and antenna unit 14. The loading of transmitter power supply 34, 40 volt power supply 26 and 12 volt regulator 24 is a function of this cable length. As a result, the actual voltage levels produced by these power supply circuits might vary. Consequently, the operation of receiver 54 and IF amplifier 56 might exhibit instability due to such voltage variations. Furthermore, since the cost of cable 16 is determined by the number of conductors included therein, it is desirable to reduce the number of such conductors. In particular, it would be advantageous to eliminate IF power conductor 42, thereby reducing the number of conductors included in cable 16 and also obviating IF power supply variations which otherwise would be caused by different lengths of the IF power conductor. The present invention accomplishes these improvements by providing power supply circuitry in antenna unit 14. The location of a power supply in the antenna unit has not been used heretofore, nor has this been thought to be feasible.

Figures 2, 3:
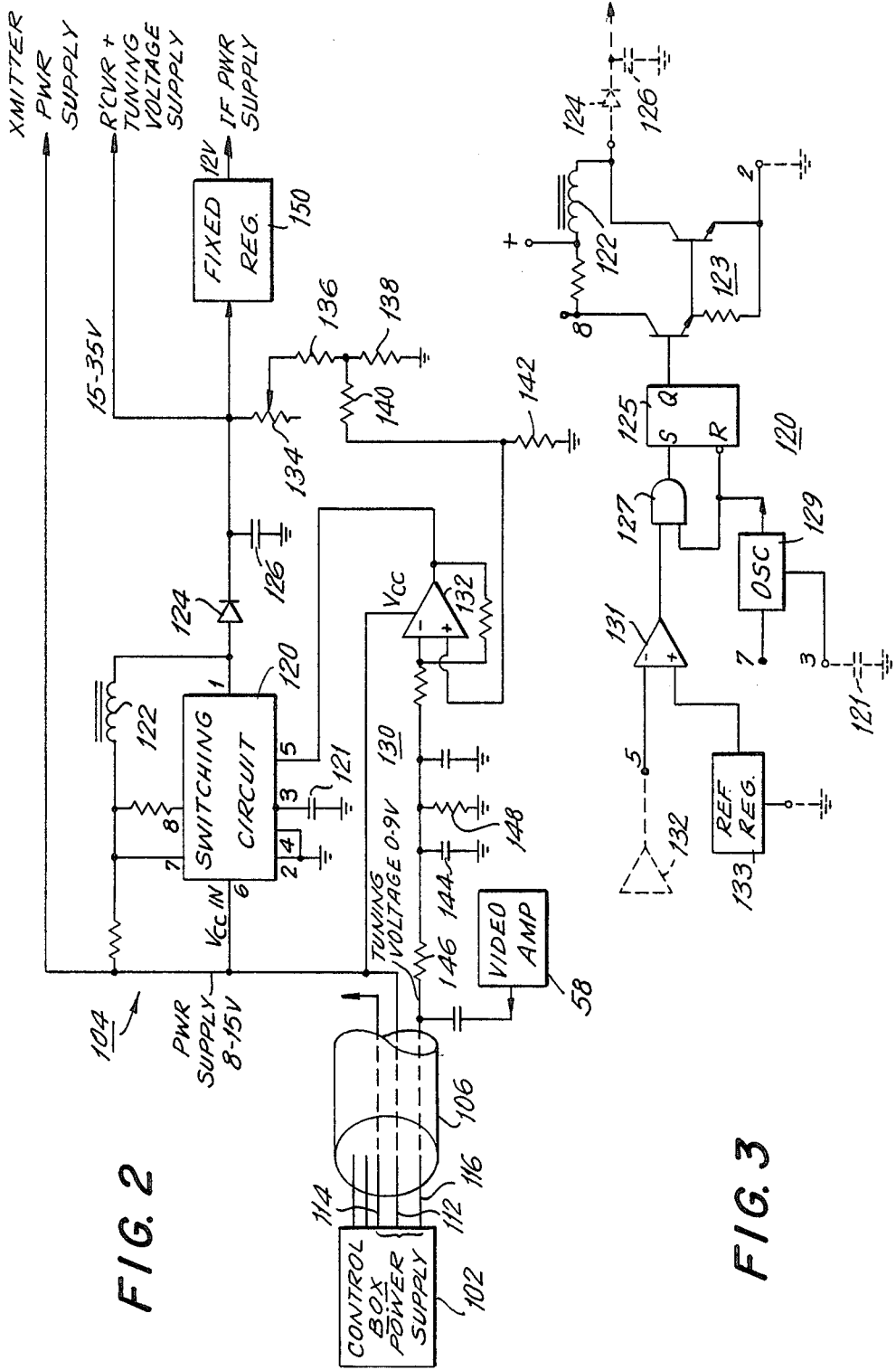
FIG. 2 is a partial block, partial schematic diagram of one embodiment of the present invention.
FIG. 3 is a schematic diagram of the switching circuit used in the embodiment shown in FIG. 2.

Turning now to FIG. 2, power supply apparatus 104 is located at the antenna unit and is coupled to control box 102 by means of multi-conductor cable 106. In particular, the number of conductors included in cable 106 is reduced from that included in cable 16 because IF power conductor 42 has been obviated. In addition to various signal-coupling conductors, cable 106 includes a power supply conductor 112, a ground conductor 114 and a tuning control conductor 116. As numerical examples, power supply conductor 112 normally is provided with a DC voltage in the range of 8–15 volts and tuning control conductor 116 normally is provided with a DC tuning control voltage on the order of 0–9 volts. Although the voltage applied to power supply conductor 112 may be the same as the voltage applied to aforedescribed transmitter power conductor 46 (FIG. 1), it is seen that, in the embodiment shown in FIG. 2, the voltage level of the tuning control voltage is reduced from that shown in FIG. 1. Conductors 112, 114 and 116 may be thought of as the power supply conductors.

Power supply apparatus 104 includes a switching mode power supply circuit 120 (shown more particularly in FIG. 3), a feedback circuit 130 connected to a control input of the switching mode power supply circuit and a fixed regulator 150 connected to the output of the switching mode power supply circuit. An input of the power supply circuit 120 is connected to power supply conductor 112 and is supplied with the operating voltage normally applied to the radar transmitter.

Power supply circuit 120 includes switching circuitry (FIG. 3) which, in combination with inductor 122, smoothing rectifier 124 and capacitor 126 provides a substantially stable output supply voltage with a magnitude greater than the power supply operating voltage applied to its input. For example, although power supply circuit 120 may be supplied with an input operating voltage on the order of 8-15 volts, the output supply voltage produced thereby is on the order of 15-35 volts DC. It will be appreciated that the actual magnitude of this output supply voltage is a function of the duty cycle of the switching circuit included in power supply circuit 120 and the input operating voltage level supplied thereto. As the duty cycle increases, the output supply voltage level also increases. Similarly, as the input operating voltage level increases, the magnitude of the output supply voltage likewise increases.

Smoothing rectifier 124 and capacitor 126 remove ripples in the switched output supply voltage produced by power supply circuit 120, as is known to those of ordinary skill in the art. Capacitor 126 is coupled to fixed regulator 150 which is of conventional construction and operates to produce a substantially constant, stable 12 volt IF power supply. It is appreciated that regulator 150 may be of relatively simple construction and of low cost to provide this constant IF power supply notwithstanding changes that might be present in the 15-35 volt output supply voltage produced by power supply circuit 120. Additionally, the output supply voltage provided across capacitor 126 is supplied as the receiver and tuning voltage supply to the receiver normally included in the antenna unit. For example, this voltage may be applied to receiver 54 shown in FIG. 1.

Feedback circuit 130 functions to maintain the output supply voltage produced across capacitor 126 at a substantially constant level. This is achieved by connecting feedback circuit 130 to capacitor 126 and to supply a control signal to a control input of power supply circuit 120 that varies inversely with a change in the output supply voltage. Thus, as the output supply voltage increases, the control signal which is fed back to power supply circuit 120 tends to reduce the duty cycle of the switching circuit included in the power supply circuit, thereby reducing the level of the output supply voltage. Conversely, if the magnitude of the output supply voltage decreases, the control signal fed back to the control input of power supply circuit 120 increases the duty cycle, thereby increasing the level of the output supply voltage. In this regard, feedback circuit 130 includes an amplifier 132 having an input coupled to capacitor 126 by means of an adjustable voltage divider circuit. This adjustable voltage divider circuit is comprised of a potentiometer 134 coupled to capacitor 126, the output of this potentiometer being connected to voltage divider resistors 136 and 138, and the output of these voltage divider resistors is connected to the input of amplifier 132 by means of yet another voltage divider formed of resistors 140 and 142. Hence, a voltage-divided proportion of the output supply voltage is applied to amplifier 132 and thence to the control input of power supply circuit 120.

Advantageously, the operation of switching mode power supply circuit 120 also is controlled by feedback circuit 130 in response to the tuning control voltage that is applied to tuning control conductor 116. In this regard, amplifier 132 is formed as a differential amplifier having one input coupled to capacitor 126, as aforementioned, and another input coupled to tuning control conductor 116 by means of a voltage divider comprised of resistors 146 and 148, as illustrated. More particularly, resistor 146 is connected in series with conductor 116 and resistor 148 is connected to resistor 146 and is coupled to ground. The junction defined by resistors 146 and 148 is, in turn, coupled to the other input of differential amplifier 132. In the illustrated embodiment, the differential amplifier includes a non-inverting input coupled to the output supply voltage provided across capacitor 126 and an inverting input coupled to the tuning control voltage supplied to conductor 116. Suitable gain-establishing resistors are connected to the differential amplifier, as illustrated.

It will be seen that amplifier 132 functions as a difference circuit to supply a control signal to the control input of power supply circuit 120 that is a function of the difference between the tuning control voltage and the output supply voltage. Any change in one or the other of these voltages results in a concomitant change in the control voltage applied to the power supply circuit. Hence, a desired change in the tuning voltage supply to effect a tuning adjustment in the radar receiver may be achieved simply by adjusting the tuning control voltage applied to conductor 116 by control box 102. It will be recognized, however, that this change in the tuning voltage supply produced by power supply circuit 120 will not affect the substantially constant 12 volt IF power supply produced by fixed regulator 150. That is, since the fixed regulator accommodates a 15-35 volt swing in the output supply voltage produced by the power supply circuits, expected changes in the tuning voltage supply will not produce a noticeable change in the 12 volt IF power supply.

To provide immunity to noise which might be present on conductor 116, a capacitor 144 is coupled to the voltage divider comprised of resistors 146 and 148, as illustrated, thereby filtering such noise. Consequently, the control signal applied to the control input of power supply circuit 120 by differential amplifier 132 is substantially insensitive to noise that might be present on conductor 116 in cable 106.

As also shown in FIG. 2, the output of video amplifier 58 (also shown in FIG. 1) is capacitor-coupled to conductor 116 so as to superimpose a video signal onto the tuning voltage level.

The operation of power supply apparatus 104 now will be briefly described. In response to the transmitter power supply voltage applied to conductor 112, switching mode power supply circuit 120 produces an output supply voltage across capacitor 126. By means of feedback circuit 130 coupled to capacitor 126, the magnitude of this output supply voltage is maintained substantially constant. In accordance with the numerical example described above, the transmitter power supply voltage may exhibit a magnitude in the range of 8-15 volts DC and the output supply voltage produced by power supply circuit 120 may have a magnitude in the range of 15-35 volts DC. This output supply voltage is applied to the radar receiver both as an operating voltage and as a tuning voltage. In addition, this output supply voltage is coupled to fixed regulator 150 whereat it is reduced to a substantially constant 12 volts DC and is utilized as the IF power supply.

To accommodate drift or other changes in the frequency to which the radar transmitter and receiver are tuned, control box 102 may be operated to adjust the level of the tuning power supply voltage applied to conductor 116 to achieve a "fine" tuning of the radar receiver. This tuning supply voltage is coupled to feedback circuit 130 and, more particularly, to differential amplifier 132 included therein. The difference between this tuning supply voltage and the output supply voltage produced across capacitor 126 is used as an adjustment voltage to adjust the operation of power supply circuit 120. Thus, any change in the tuning supply voltage or in the output supply voltage results in an adjustment in the operation of the power supply circuit. However, since fixed regulator 150 produces a substantially constant 12 volt IF power supply voltage over a relatively broad range of output supply voltage levels, any adjustment in the tuning supply voltage applied to conductor 116 will not affect the IF power supply.

From FIG. 2, it is seen that the operating potential $V_{cc}$ applied to power supply circuit 120 and to differential amplifier 132 is equal to the transmitter power supply voltage received over conductor 112.

Thus, it is not necessary for control box 102 to generate an IF power supply voltage. Rather, this IF power supply voltage may be generated locally at the antenna unit by means of power supply apparatus 104. Furthermore, although a relatively low level (8–15 volts DC, as an example) power supply voltage may be coupled to the antenna unit by way of conductor 112 included in cable 106, a significantly higher receiver and tuning voltage supply (on the order of 15–35 volts) can be produced by the power supply apparatus disposed locally at the antenna unit.

FIG. 3 is a schematic representation of switching mode power supply circuit 120. It will be noted that the various input and output terminals which are identified by pin numbers 1–8 of power supply circuit 120 in FIG. 2 are used in FIG. 3 to identify the very same terminals. Power supply circuit 120 includes a switching circuit 123 driven by a flip-flop circuit 125 whose set and reset conditions are controlled by an oscillator 129 and an AND gate 127. The AND gate is coupled to the oscillator and also to a comparator 131, this comparator being coupled to a reference generator 133 and also to the output of differential amplifier 132. More particularly, switching circuit 123 is comprised of a pair of transistors whose collectors are coupled to pins 1 and 8, respectively. Operating voltage, such as the transmitter power supply voltage supplied by conductor 112 of cable 106 is applied to pin 1 by means of inductor 122. This operating voltage also is coupled to pin 8 by means of a resistor. The transistors included in switching circuit 123 are seen to be connected in a current amplification mode in which the emitter electrode of one is used to drive the base electrode of the other.

Switching circuit 123 is driven by flip-flop circuit 125 whose set input is coupled to the output of AND gate 127 and whose reset input is coupled to the output of oscillator 129. The oscillator operates at a frequency determined by a timing capacitor 121 which, as illustrated in FIGS. 2 and 3, is connected to pin 3. Pin 7 of the power supply circuit is supplied with the power supply voltage coupled by conductor 112. Any change in this power supply voltage results in a change in the frequency of oscillator 129, thereby changing the operation of flip-flop circuit 125 and, as a result, a change in the duty cycle of switching circuit 123. Consequently, the magnitude of the output supply voltage produced at pin 1 undergoes a corresponding change. Preferably, the reset input of flip-flop circuit 125 is an inverting input such that the flip-flop circuit is reset when the output of oscillator 129 is of a relatively low level. For example, the flip-flop circuit is reset during negative half cycles of the oscillator output.

Reference generator 133 provides a stable reference voltage substantially independent of changes in temperature. This stable reference voltage is applied to, for example, a non-inverting input of comparator 131. This comparator (which may be formed as a differential amplifier) includes an inverting input coupled to pin 5 which, in turn, is supplied with the control adjustment signal produced by differential amplifier 132 of feedback circuit 130. The output of comparator 131 is coupled to AND gate 127 whereat it is compared to the output of oscillator 129. When the magnitude of the oscillator output increases to a level equal to the output of comparator 131, AND gate 127 sets flip-flop circuit 125. When the oscillator output commences its negative half cycle, flip-flop circuit 125 is reset. Thus, the duty cycle of switching circuit 123 is determined by the output of comparator 131.

In operation, in the absence of any change in the tuning supply voltage applied to conductor 116, it is assumed that the output of differential amplifier 132 remains substantially constant. Since the output of reference generator 133 likewise remains constant, and since the frequency of oscillator 129 also remains constant, as determined by the value of timing capacitor 121, switching circuit 123 operates with a fixed duty cycle to produce a substantially constant, stable output supply voltage across capacitor 126. Let it be assumed that the tuning supply voltage applied to conductor 116 is increased. As a result, the output of differential amplifier 132 decreases. Hence, the output of comparator 131 increases. As a result, additional time now is needed for the oscillator output to rise to a level equal to the output of comparator 131. Accordingly, the time in which flip-flop circuit 125 is set now is delayed, thereby reducing the duty cycle of switching circuit 123. Conversely, if the magnitude of the tuning supply voltage decreases, the output of differential amplifier 132 increases, thereby reducing the output level of comparator 131. The time at which the output of oscillator 129 reaches a level equal to the output of comparator 131 now is advanced, thereby advancing the time at which the flip-flop circuit is set. Hence, the duty cycle of switching circuit 123 is increased.

While the present invention has been particularly shown and described with reference to a preferred embodiment, it will be readily appreciated by those of ordinary skill in the art that various changes and modifications may be made without departing from the spirit and scope of the invention. The numerical examples discussed above are not intended to limit the present invention solely to the specific ranges which have been described. Likewise, modifications in circuit details are contemplated. The particular construction of switching mode power supply circuit 120 need not be limited solely to the embodiment shown in FIG. 3. Indeed, this embodiment is conventional and forms no part of the present invention per se. One example of the circuitry shown in FIG. 3 is manufactured by Motorola and is identified by Motorola Part No. 34063. However, the combination of this switching mode power supply circuit with feedback circuit 130 and fixed regulator 150, which results in the advantages and benefits discussed hereinabove is believed novel.

It is intended that the present invention be limited solely by the claims appended hereto, together with the equivalents thereof.

What is claimed is:

1. Power supply apparatus for a radar system of the type having a control box including signal processing means and a source of electrical power for providing a DC power supply voltage to at least transmitter means located at an antenna unit, an antenna unit remote from said control box and including an antenna, transmitter means including in said antenna unit for transmitting a radar signal, receiver means included in said antenna unit for receiving a radar signal and IF means included in said antenna unit for providing an IF signal in response to the received radar signal, and a coupling cable of variable length between said control box and said antenna unit for coupling signals therebetween and for coupling said DC power supply voltage from said control box to said transmitter means, said power supply apparatus being located at least antenna unit and responsive to said DC power supply voltage from said control box, comprising:

a switching mode power supply circuit having an input coupled to receive said DC power supply voltage from said coupling cable of variable length and an output for providing a substantially stable output supply voltage for said receiver means;

feedback means responsive to said output supply voltage and coupled to a control input of said switching mode power supply circuit for adjusting the operation of said switching mode power supply circuit to maintain said substantially stable output supply voltage; and voltage regulating means coupled to receive said output supply voltage for supplying an IF power supply voltage to said IF means.

2. The apparatus of claim 1 wherein said feedback means includes difference means for producing an adjustment signal as a function of the difference between voltages applied to first and second inputs thereof; means for applying a voltage derived from said output supply voltage to the first input of said difference means; means for applying a control signal to the second input of said difference means; and means for applying said adjustment signal produced by said difference means to said control input of said switching mode power supply circuit.

3. Power supply apparatus for a radar system of the type having a control box including signal processing means a source of electrical power, an antenna unit remote from said control box and including an antenna, transmitter means for transmitting a radar signal, receiver means for receiving a radar signal and IF means for providing an IF signal in response to the received radar signal, and a coupling cable of variable length between said control box and said antenna unit for coupling signals therebetween and for coupling a DC power supply voltage from said control box to said transmitter means, said power supply apparatus being located at said antenna unit and responsive to said DC power supply voltage from said control box, comprising:

a switching mode power supply circuit having an input coupled to receive said DC power supply voltage and an output for providing a substantially stable output supply voltage for said receiver means;

feedback means responsive to said output supply voltage and coupled to a control input of said switching mode power supply circuit for adjusting the operation of said switching mode power supply circuit to maintain said substantially stable output supply voltage, said feedback means including difference means for producing an adjustment signal as a function of the difference between voltages applied to first and second inputs thereof; means for applying a voltage derived from said output supply voltage to the first input of said difference means; means for applying a control signal to the second input of said difference means; and means for applying said adjustment signal produced by said difference means to said control input of said switching mode power supply circuit; and voltage regulating means coupled to receive said output supply voltage for supplying an IF power supply voltage to said IF means; and wherein said receiver means includes adjustable tuning means responsive to a tuning power supply voltage to adjust the frequency to which said receiver means is tuned; wherein said coupling cable couples a tuning control voltage from said control box to said antenna unit; and wherein said means for applying a control signal to the second input of said difference means includes means for deriving said control signal from said tuning control voltage coupled to said antenna unit.

4. The apparatus of claim 3 wherein said difference means comprises a differential amplifier.

5. The apparatus of claim 3 wherein said output of said switching mode power supply circuit comprises a smoothing rectifier.

6. The apparatus of claim 3 wherein said switching mode power supply circuit provides a substantially stable output supply voltage of a magnitude greater than said power supply voltage coupled to said antenna unit and includes a reference generator for generating a reference voltage substantially independent of temperature, a comparator for comparing the adjustment signal applied to said control input to said reference voltage, and means for varying said output supply voltage as a function of the comparison of said adjustment signal to said reference voltage.

7. The apparatus of claim 6 wherein said switching mode power supply circuit includes a switching circuit for providing said output supply voltage as a function of the duty cycle of said switching circuit; and wherein said comparator includes an output coupled to said switching circuit for varying said duty cycle.

8. The apparatus of claim 6 wherein said means for applying a voltage derived from said output voltage includes adjustable potentiometer means coupled to said smoothing rectifier.

9. The apparatus of claim 8 further comprising voltage dividing means connected in series with said adjustable potentiometer means.

10. The apparatus of claim 3 wherein said means for deriving said control signal from said tuning control voltage includes voltage dividing means.

11. The apparatus of claim 10 wherein said means for deriving said control signal from said tuning control voltage includes smoothing capacitance means coupled to said voltage dividing means to filter noise that may be present on said coupling cable.

12. A stabilized power supply for a radar system having a control box, an antenna unit and a cable of variable length for coupling said control box to said antenna unit to communicate signals therebetween and to supply a power supply voltage to said antenna unit, said antenna unit having a transmitter for transmitting a radar signal of predetermined frequency, a tunable receiver for receiving a radar signal of said predetermined frequency, and an IF amplifier for providing an IF signal in response to a received radar signal, and said cable having only two power supply leads for supplying a power supply voltage and a tuning voltage, respectively, to said antenna unit, said power supply voltage being applied to said transmitter, said stabilized power supply comprising:

a switching mode power supply circuit having an input for receiving said power supply voltage supplied by said cable and further having a switching circuit operable with a controllable duty cycle for producing an output supply voltage of a magnitude determined by said duty cycle and by the level of the received power supply voltage;

feedback means having an output coupled to a control input of said switching circuit and responsive to said output supply voltage and to said tuning voltage for determining said duty cycle of said switching circuit and thereby determining said output supply voltage, such that said output supply voltage remains substantially constant if said tuning voltage is fixed and said output voltage varies if said tuning voltage varies;

means for supplying said output supply voltage to said receiver; and voltage regulating means coupled to receive said output supply voltage for producing a substantially constant IF power supply voltage and for applying said IF power supply voltage to said IF amplifier.

* * * * *